May 5, 1936.                H. K. SMITH                2,039,357
                      SIDE FRAME AND JOURNAL BOX
                Filed Nov. 19, 1923         5 Sheets-Sheet 1

Inventor
Harold K. Smith
By [signature] his Attorney

May 5, 1936.  H. K. SMITH  2,039,357
SIDE FRAME AND JOURNAL BOX
Filed Nov. 19, 1923  5 Sheets-Sheet 2
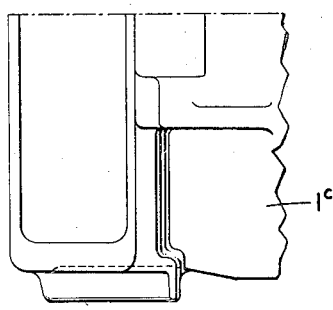
FIG. 8
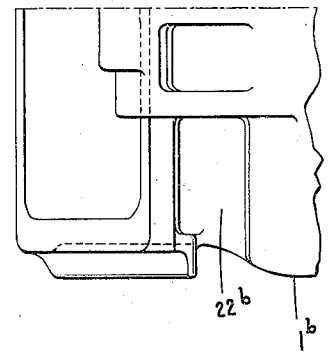
FIG. 6
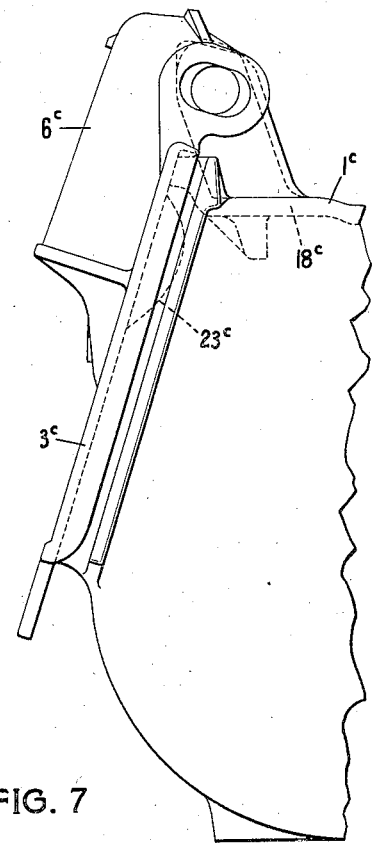
FIG. 7
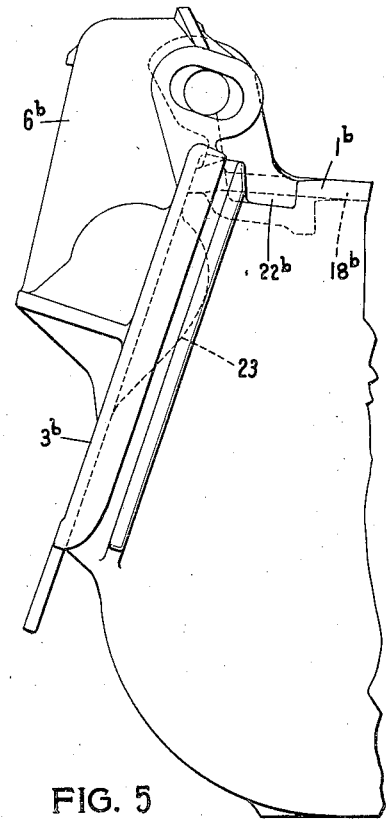
FIG. 5
Inventor
Harold K. Smith
By
his Attorney May 5, 1936.  H. K. SMITH  2,039,357
SIDE FRAME AND JOURNAL BOX
Filed Nov. 19, 1923  5 Sheets-Sheet 3
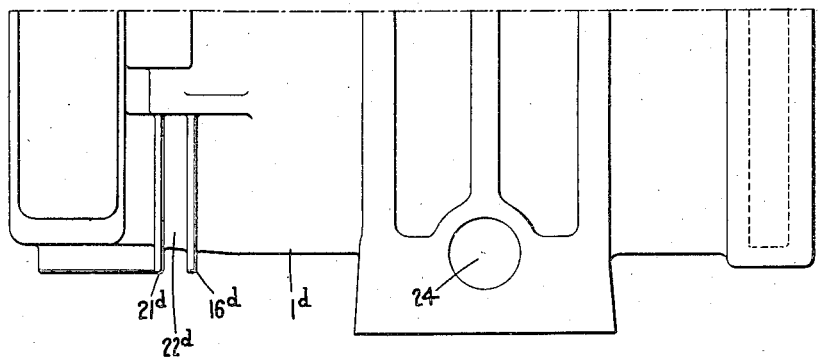
FIG. 10
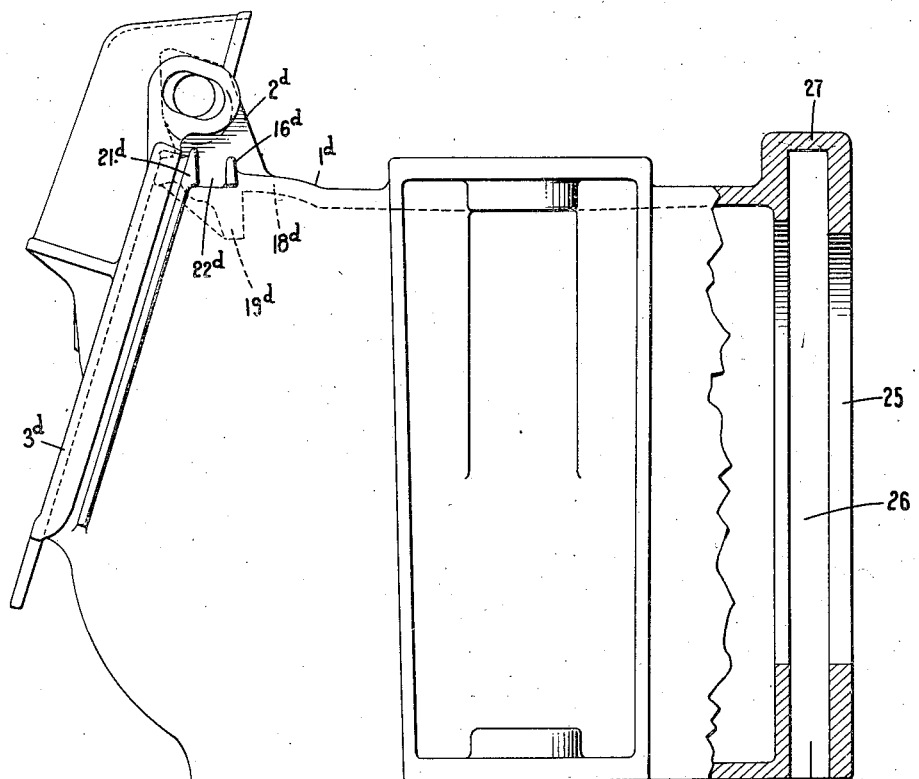
FIG. 9
Inventor
Harold K. Smith
By 
his Attorney

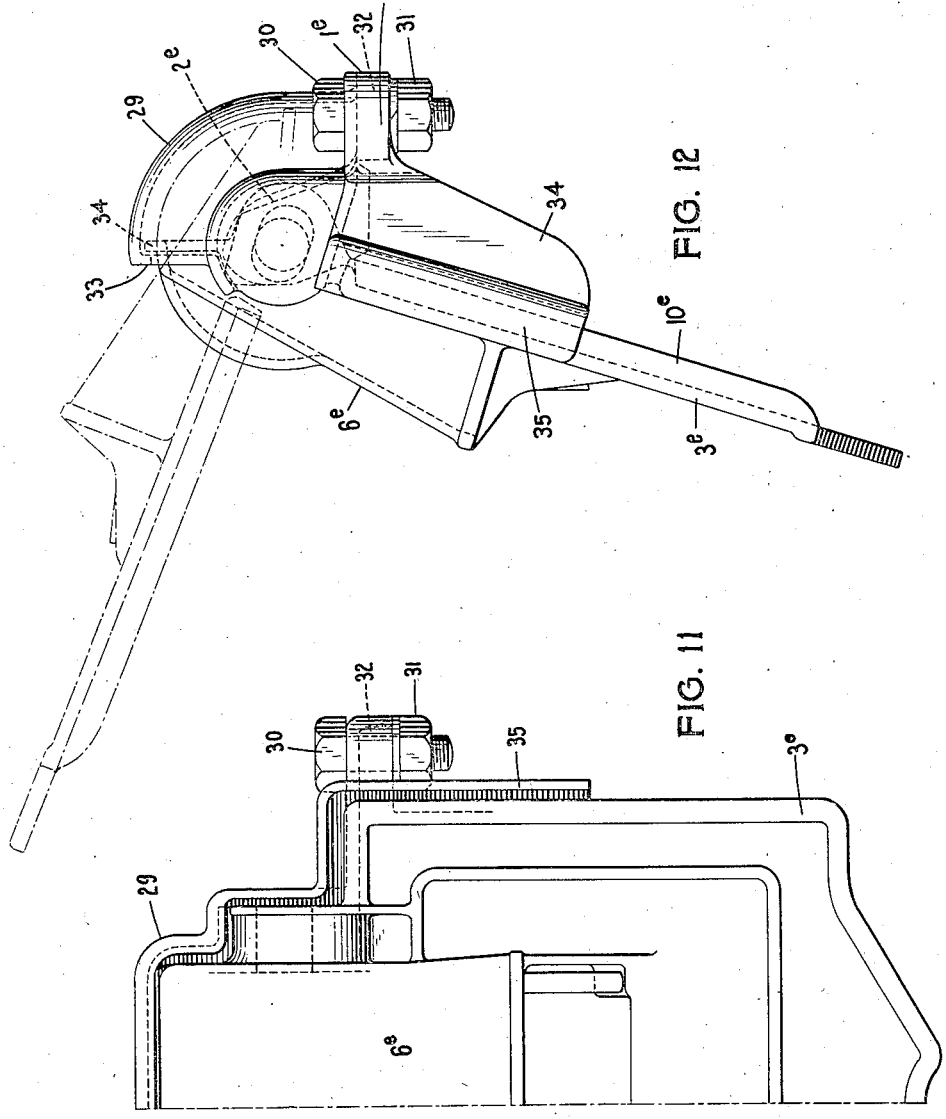

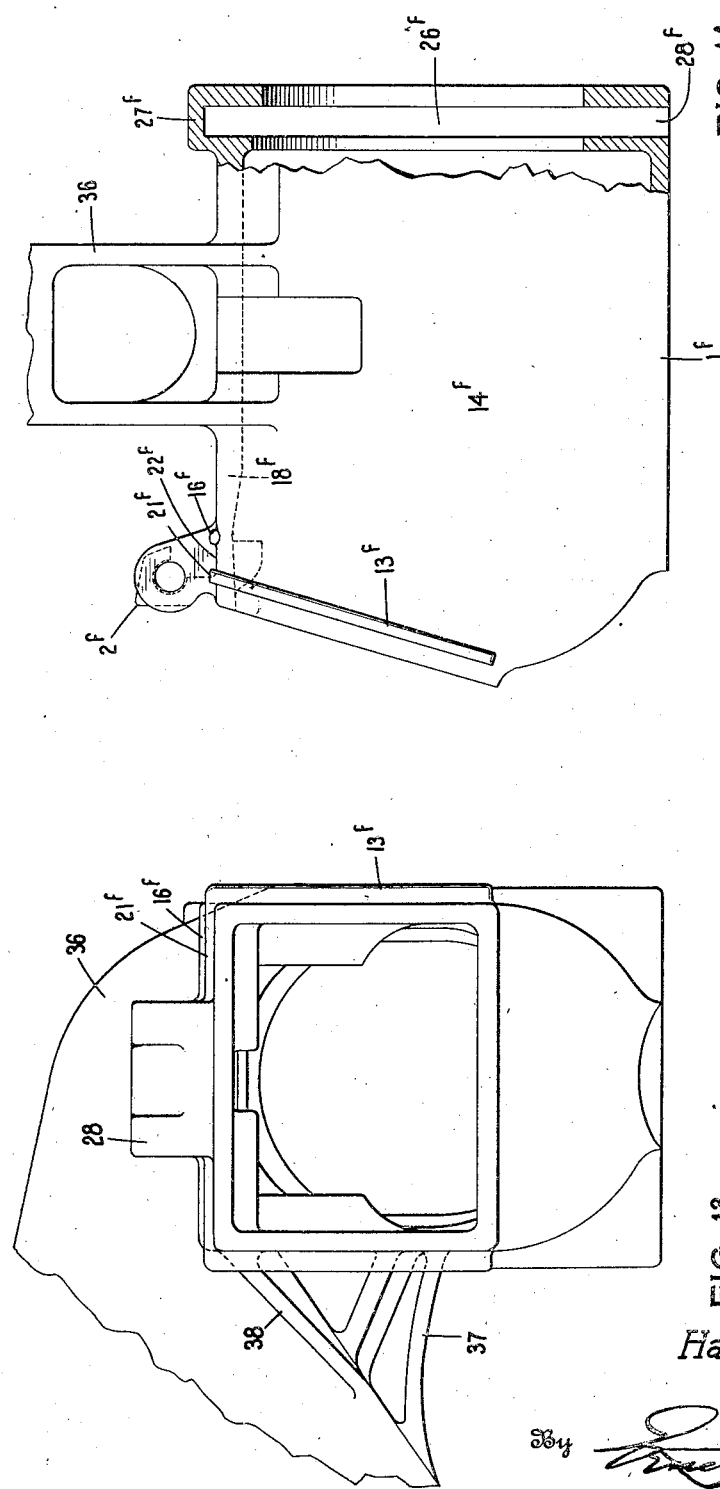

Patented May 5, 1936

2,039,357

UNITED STATES PATENT OFFICE 2,039,357

SIDE FRAME AND JOURNAL BOX

Harold K. Smith, Oak Park, Ill., assignor to The Symington Company, Rochester, N. Y., a corporation of Maryland Application November 19, 1928, Serial No. 320,344

21 Claims. (Cl. 308—45)

This invention relates to journal boxes either integral with or adapted for connection to associated side frames and more particularly to means for preventing the entrance of water, brine, or other foreign material into said journal boxes.

The principal object of my invention, generally considered, is to provide a journal box and associated lid, said lid being formed with flanges overlying the edges of the journal box around the outer opening thereof at the top and sides, and said box being formed with outstanding flanges overlying the lid flanges for preventing foreign material being blown under the lid flanges into the box, said lid being also desirably formed with a hood overlying the hinge lug for further waterproofing the construction, and the dust guard well of the box being preferably closed at the top and opening downwardly.

Another object of my invention is to provide a brine proof journal box lid particularly adapted for refrigerator cars, said lid and box being respectively provided with overlapping flanges to avoid the possibility of brine or other foreign material being blown into the box underneath the lid.

A further object of my invention is to provide a journal box with a hinged preferably hooded lid pivoted thereto, said box being, if desired, provided with an auxiliary hood interlocking with the hood of the lid and covering the hinge lug for water-proofing the connection between the lid and the box.

A still further object of my invention is to provide a journal box with a flange lying near the edge of the front opening therein for cooperation with the associated lid to prevent the entrance of foreign material into the box under said lid, and a second flange rearwardly of said first flange to provide a trough therebetween for draining water or the like from the box and avoiding its entrance thereinto under the lid.

An additional object of my invention is to provide a hooded lid pivotally connected to a journal box for closing the outer opening therein, said hood serving to prevent the entrance of foreign material into the box under the lid, and said box being formed with flanges providing means for preventing water from being blown under the lid into the box and forming a trough to receive water and the like which is shed by the hood and permitted to drain away from the box.

Another object of my invention is to provide a journal box with a dust guard well closed at the top and opening downwardly for receiving any desired form of dust guard, whereby water and the like is prevented from seeping into the rear opening in the journal box.

Other objects and advantages of the invention relating to the particular arrangement and construction of the various parts will become apparent as the description proceeds.

Referring to the drawings illustrating my invention, the scope whereof is defined by the appended claims.

Figures 5 and 6 are views corresponding respectively to Figures 1 and 2 but showing another modification.

Figures 7 and 8 are views corresponding respectively to Figures 1 and 2 but showing a further modification.

Figure 9 is a side elevation of a journal box adapted for attachment to an associated side frame with a lid pivotally mounted and covering the front opening therein, and a downwardly opening dust guard well, a portion of said box being illustrated in vertical section to more clearly show the dust guard well construction.

Figure 10 is a fragmentary plan of the box shown in Figure 9 with the lid removed.

Figure 11 is a fragmentary front elevation of a lid and associated auxiliary hood connected to an associated journal box.

Figure 12 is a side elevation of the lid and auxiliary hood shown in Figure 11, the open position of the lid being diagrammatically illustrated in dot and dash lines.

Figure 13 is a fragmentary front elevation of an end of a side frame with an integral journal box embodying my invention.

Figure 14 is a fragmentary end elevation of the side frame and integral journal box illustrated in Figure 13, a portion of the box being shown in section to more clearly illustrate the dust guard well construction.

Figure 15 is a fragmentary plan of the end of the side frame and integral journal box illustrated in Figures 13 and 14.

Figure 2:
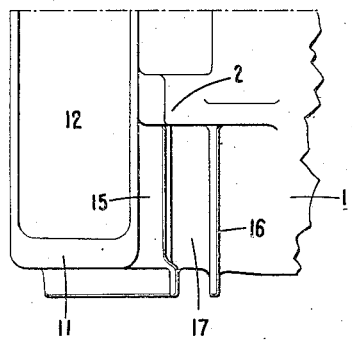
Figure 2 is a fragmentary plan of the box shown in Figure 1.
Figure 1:
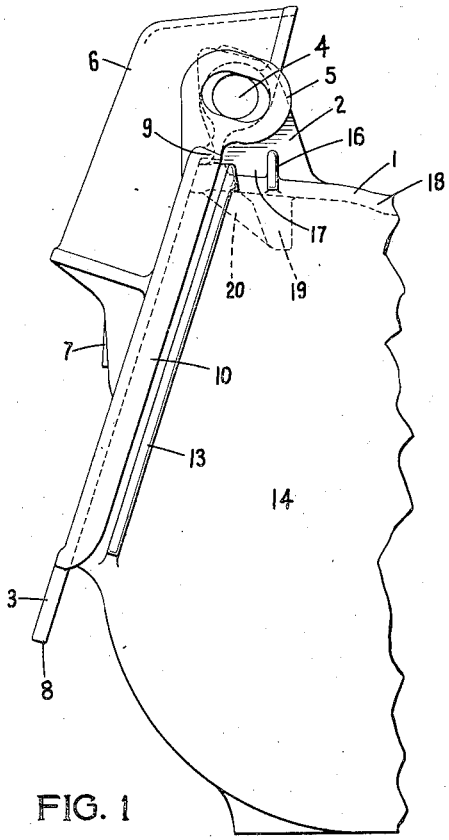
Figure 1 is a fragmentary side elevation of the front part of a journal box and associated hooded lid pivotally mounted on a hinge lug extending from the top wall or roof thereof.

Referring to the drawings in detail, like parts being designated by like reference characters, and first considering the embodiment of my invention illustrated in Figures 1 and 2, there is shown a journal box 1 with a hinge lug 2 on the top wall or roof thereof to which is pivoted a lid 3 as by means of a hinge pin or pintle 4 extending through hinging ears 5 on the lid. The lid is preferably of the type as described and claimed in the Barrows application Ser. No. 746,795, filed October 30, 1924, now Patent No. 1,782,055, dated November 18, 1930, having a hood 6 enclosing a torsion spring 7 between the outer face of said lid and said hood for coacting with the outer angularly disposed bearing faces on the lug 2 for holding the lid in open or closed position as will be understood. Said lid is desirably provided with a downward extension 8 adapted to be grasped for manually opening and closing it and the top and side edges of said lid are desirably formed with depending or rearwardly extending flanges 9 and 10 which overlie the outer edge 11 of the box walls around the front or outer opening 12 therein. The hood 6 preferably extends rearwardly beyond the hinge lug 2 so that normally said box is pretty well protected from the entrance of water and other foreign material.

For use on refrigerator cars, where brine is continually dropping after icing, it is especially desirable to have a construction which prevents the entrance of any brine because of its particularly deleterious action. For that purpose I have provided a flange 13 extending along the outer surfaces of the sides 14 on the box closely adjacent the rib or flange 10 on the lid so as to serve for deflecting any foreign material which might be blown under the flange 10 of the lid and so on into the box. The flanges or ribs 13 on the sides of the box are joined over the top of the box by a thickened portion 15 adjacent the upper portion of the flange 9 on the lid. Rearwardly of said thickened portion 15, I provide a flange or rib 16 which forms with the thickened portion 15 a trough 17 adapted to serve for collecting water, brine or other material and draining it from the top of the box rearwardly of the flanges 13 on said box so that such material is prevented from entering said box. For reinforcing the upper wall or roof 18 of the box, there is desirably provided a depending boss, rib or flange 19 underlying the flange 16, preferably substantially parallel thereto, and desirably reinforced by one or more forwardly extending webs or gussets 20. Although the foregoing construction is especially desirable for refrigerator cars, I do not wish to be limited to such, as it is adapted for use on all rolling stock.

Figure 4:
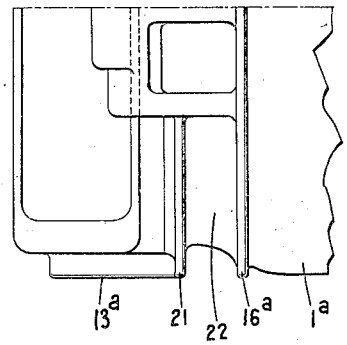
Figures 3 and 4 are views corresponding respectively to Figures 1 and 2 but showing a modification.
Figure 3:
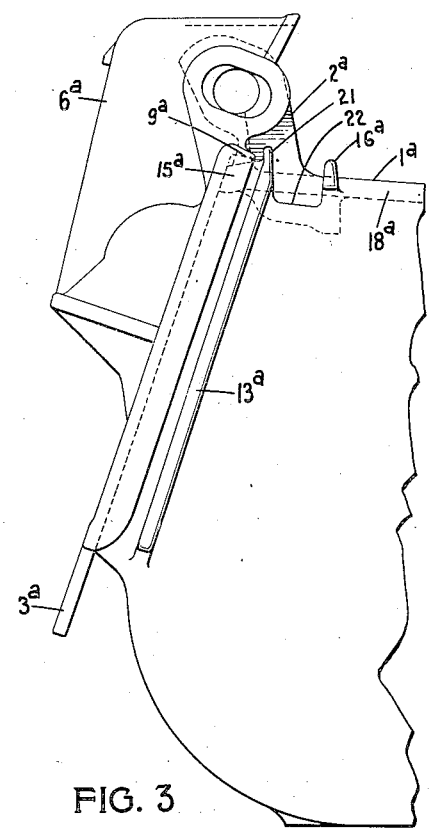

Referring now to the embodiment of my invention illustrated in Figures 3 and 4, a journal box 1$^a$ and lid 3$^a$ are there shown which are very similar to the journal box and lid of Figures 1 and 2, except the hood 6$^a$ on the lid is of somewhat different formation and the thickened portion 15$^a$ along the upper front edge of the box is provided with an upstanding rib or flange 21 extending above or overlapping the rib or upper flange 9$^a$ on the lid 3$^a$ for more completely protecting said box from the entrance of foreign material under the lid 3$^a$. For more completely draining water or the like from the top of the wall 18$^a$ of the box, the trough 22 adjacent the front edge of the box roof, or between the flange 21 and the rearwardly spaced flange 16$^a$, is preferably sloped from the lug 2$^a$ on the box toward the sides thereof, so that water or the like is more quickly discharged from the top of the box rearwardly of the side flanges 13$^a$ thereon. The roof of the box is desirably downwardly offset, or formed with reinforcements, beneath the portions of the trough on either side of the hinge lug, as illustrated.

Referring now to the embodiment of my invention illustrated in Figures 5 and 6, a box 1$^b$ and lid 3$^b$ are illustrated which may be identical with the box and lid of Figures 3 and 4, except that the hood 6$^b$ is of a different shape. The front face of the lid proper is depressed as indicated at 23 for receiving the coils of the associated torsion spring (not shown), and the trough 22$^b$ is formed by merely depressing the top wall or roof 18$^b$ of the box 1$^b$ while omitting the flanges on either side thereof indicated in Figures 3 and 4 by the reference characters 16$^a$ and 21. The construction may also be considered as practically identical with that of Figures 1 and 2 with the omission of the flange 16 and the depressing of a trough in the roof as in Figures 3 and 4.

Referring now to the embodiment of my invention illustrated in Figures 7 and 8, a journal box 1$^c$ and lid 3$^c$ are illustrated and the construction may be practically identical with that of Figures 1 and 2, except for the depression 23$^c$ in the front face of the lid 3$^c$, the different shaped hood 6$^c$ and the omission of the flange 16 rearwardly of the enlarged portion 15 along the front edge of the roof 18$^c$ of the box.

Referring now to the embodiment of my invention illustrated in Figures 9 and 10, a box 1$^d$ and lid 3$^d$ are there disclosed which may be practically identical with the box and lid of Figures 3 and 4, except that the trough 22$^d$ between the flanges 16$^d$ and 21$^d$ is horizontal and depressed below the main portion of the roof 18$^d$ rather than being sloped from the lug 2$^d$, and the roof 18$^d$ of the box has a reinforcement 19$^d$ on its under surface corresponding with the reinforcement 19 of Figures 1 and 2.

The box of the present embodiment is of the separable type, that is, it is formed separate from the associated side frame (not shown) and adapted to be connected thereto in any desired manner as by means of bolts (not shown) passing through apertures 24 in the central or frame engageable or engaging abutment portion of the box and registering apertures in the frame (not shown). The inner or rearward flange 16$^d$ is, as in the embodiments of Figs. 1 to 4, inclusive, spaced from central or raised frame abutment portion of the box or roof thereof, or that portion to which forces are transmitted from the associated frame. The box, in the present embodiment, has a usual inner opening 25 defined by a dust guard well 26, and said well instead of opening upwardly as is usual is closed at the top as indicated at 27, and formed with a lower opening 28 in which may be inserted any usual or desired form of dust guard (not shown). On account of this construction, water and the like, which might otherwise seep through the top opening in the dust guard well and on into the box, is prevented from so doing.

Referring now to the embodiment of my invention illustrated in Figures 11 and 12, a journal box lid 3$^e$ is illustrated pivoted to a lug 2$^e$ on a journal box 1$^e$ as in the previous embodiments. Instead of providing the water deflecting flanges on the box, as in the previous embodiments, an auxiliary hood 29 is provided and connected to the box in any desired manner as by means of bolts 30 and nuts 31 extending through lugs 32 cast on top of the box and corresponding lugs or ears 33 on its auxiliary hood. Said hood member 29 preferably interlocks with the top of the hood 6$^e$ on the lid by being provided with a lip or flange 33 overlying a corresponding lip or flange 34 on the hood 6$^e$ and closely embracing it when the lid is closed, as indicated most clearly in Figure 12. The auxiliary hood and lid construction is such that the lid is permitted to freely open as indicated by dot and dash lines in Figure 12, and when closed, the auxiliary hood 29 acts as a water seal around the rear opening in the hood 6ᵉ, as well as around the entire upper edge of the lid, downward extensions 34 being desirably provided which are formed with outstanding flanges 35 overlapping or embracing the corresponding flanges 10ᵉ on the lid to seal the edges thereof particularly adjacent the upper portion of said lid, from the entrance of foreign material thereunder and into the box.

Referring now to the embodiment of my invention illustrated in Figures 13, 14 and 15, a box 1ᶠ is illustrated which instead of being separate from and adapted for connection to an associated side frame is formed integral with such a frame 36 and the connection thereto is additionally reinforced by integral gusset members 37 and 38. Said box, as in the previous embodiment, is desirably provided with a hinge lug 2ᶠ adapted to provide for the connection of an associated lid (not shown). As in the previous embodiments, the sides 14ᶠ of the box are formed with outstanding flanges or lips 13ᶠ positioned close to the front edges of said sides to cooperate with corresponding flanges on the associated lid (not shown). As in Figures 3 and 4, for example, the flanges 13ᶠ are continued over the top 18ᶠ of the box as flanges 21ᶠ for a similar purpose. Positioned parallel to and rearwardly of the flanges 21ᶠ, but spaced forwardly or outwardly of the frame 36, or frame engaging portion of the box, are flanges 16ᶠ, as in Figures 3 and 4, providing a trough 22ᶠ for the drainage of water or the like. In the present embodiment, however, the trough is not sloped or depressed beneath the normal elevation of the roof on the top wall of the box. A trough is also provided between the flanges 16ᶠ and the front wall of that portion of the side frame 36 which joins and reinforces the top wall of the box.

As in the embodiment illustrated in Figures 9 and 10, a dust guard well 26ᶠ is preferably closed at the top as indicated at 27ᶠ and provided with a bottom opening 28ᶠ for receiving any usual or desired form of dust guard. The elevated portion of the top wall of the box which closes the dust guard well and the rear wall of that portion of the side frame 36 which joins and reinforces the top wall of the box, likewise define a trough adapted for the drainage of water from the top of the box.

From the foregoing description, it will be seen that I have devised a brine-proof journal box lid and box construction which may be embodied in various modified forms including the use of an auxiliary hood covering the hinge lug and interlocking with the lid hood. The box may have a single rib or flange extending along the edge of the lid, flange or lip, or in addition may have a rearwardly spaced flange providing a trough between it and the first flange for draining water and the like from the roof of the box.

Having now described my invention, I claim:

1. In combination with a journal box having an opening therein, a lid pivotally connected thereto for closing said opening, and outstanding flanges on said box adjacent the upper and side edges of said opening for preventing the entrance of foreign material into said box under said lid, said box roof rearwardly of the flange adjacent the upper edge of the opening sloping for the drainage of water.

2. In combination with a journal box having an opening therein, a lid pivotally connected thereto for closing said opening, said lid having side flanges and a top flange disposed adjacent edge portions of said box defining said opening, and outstanding flanges on said box adjacent flanges on said lid for preventing water or the like from being blown under the lid flanges into said box, the top of said box adjacent the top flange sloping away to prevent water from entering the box.

3. In combination with a journal box having an opening therein, a lid pivotally connected thereto for closing said opening, extending above the top of the box, and provided with flanges overlying the peripheral edges of said box around said opening at the top and sides thereof, and outstanding flanges on said box overlapping the lid flanges when the lid is closed for preventing the entrance of foreign material into said box.

4. In combination with a journal box having an opening therein and a frame-force-receiving portion on the top thereof, a lid pivotally connected thereto for closing said opening, an upstanding flange on the top of said box adjacent an edge of said lid for preventing the entrance of foreign material thereunder and another flange on the roof of said box rearwardly spaced from the first flange, forwardly spaced from said force-receiving portion, and providing a trough therebetween for the drainage of water or the like.

5. In combination with a journal box having an opening therein and a force-receiving portion on the top thereof, a lid pivotally connected thereto for closing said opening, a flange on the roof of said box adjacent the upper edge of said lid, and a flange rearwardly spaced therefrom, parallel therewith, and spaced from said force-receiving portion, those portions of the roof between said flanges sloping from the center thereof toward the sides for draining water and the like from said roof and preventing it from entering the box.

6. In combination with a journal box having an opening therein, a lid pivotally connected thereto for closing said opening, outstanding flanges on said box adjacent the upper and side edges of said opening for preventing the entrance of foreign material into said box under said lid, and a flange on the roof of said box rearwardly spaced with respect to the flange on the upper edge of said opening and forming a trough therebetween for the drainage of water.

7. In combination with a journal box having an opening therein, a lid pivotally connected thereto for closing said opening, said lid having flanges overlying the peripheral edges of said box at the top and sides of the opening therein, outstanding flanges on said box overlapping the lid flanges when the lid is closed for preventing the entrance of foreign material into said box, and a flange on the roof of said box spaced rearwardly from the first mentioned box flanges to provide a drainage trough therebetween.

8. In combination with a journal box having an opening therein, a lid pivotally connected thereto for closing said opening, outstanding flanges on said box for preventing the entrance of foreign material into said box under said lid, and a hood on said lid extending rearwardly beyond said flanges for preventing water from dropping on the box forwardly of said flanges.

9. In combination with a journal box having an outer opening therein, a lid pivotally connected thereto for closing said opening, outstanding flanges on said box adjacent said opening for preventing the entrance of foreign material under said lid, an additional flange on the roof of said box rearwardly spaced with respect to the first mentioned flanges to form a trough therebetween, and a hood on said lid extending rearwardly beyond the first mentioned flanges and adapted to permit water to drop into said trough but prevent it from dropping forwardly of the first mentioned flanges.

10. In combination with a journal box having an outer opening therein, a lid pivotally connected thereto for closing said opening, and provided with flanges overlying the peripheral edges of said box around said opening at the top and sides thereof, outstanding flanges on said box overlapping the lid flanges when the lid is closed, another flange on the roof of said box rearwardly spaced from the first mentioned box flanges to provide a trough therebetween, and a hood on said lid overlying the first mentioned box flanges and stopping short of the last mentioned box flange.

11. A journal box having an opening in one end for receiving an associated journal, a dust guard well adjacent said opening, means closing the top of said well for preventing the entrance of foreign material thereinto, a bottom opening in said well for receiving an associated dust guard, the other end of said box being formed with an opening, a lid hinged to said box and normally closing said opening, said lid having flanges overlying the outer edges of the corresponding walls of the box, and flanges on said box adjacent the edge of said lid flanges for preventing the entrance of foreign material under said lid.

12. A journal box having a roof, with a force-receiving portion generally central thereof, and an opening adapted to be closed by a lid, said roof being provided with a trough adjacent the opening for draining water or the like from said box and preventing it from entering under the inner side of said lid, said trough being defined by a wall portion spaced from said force-receiving portion, and said trough having a lower surface inclining downwardly toward a side of the box.

13. In combination, a journal box having a roof and an outer opening, a hinge lug upstanding from said roof adjacent said opening and shorter than the width of said box, and a lid pivotally connected to said lug for closing said opening, said roof adjacent said opening being formed with troughs extending from opposite ends of said hinge lug toward the sides of the box, the bottoms of said troughs being inclined downwardly from the lug to the outer ends thereof.

14. A journal box formed with a roof, with a frame-force-receiving portion on the top thereof, and an outer opening adapted to be closed by a lid, said roof being formed with a trough spaced forwardly from said force-receiving portion so as to be disposed adjacent said opening, said roof being formed with a reinforcement on its lower surface extending in the direction of the length of the trough and underlying the inner portion thereof.

15. In combination, a journal box formed with a roof, with a frame-force-receiving portion on the top thereof, and an outer opening, a lid pivotally connected to said box for closing said opening, the roof adjacent said opening being formed with a trough spaced forwardly from said force-receiving portion and inclined downwardly toward a side of the box, the interior of said box being formed with a reinforcement adjacent, and extending substantially parallel, to said trough.

16. A journal box having an inner opening therein for receiving an associated journal and an outer one to provide access thereto, a dust guard well disposed outwardly of said inner opening, the roof of said journal box being formed with means, upstanding from the top of the box, extending approximately to the sides of said box, and spaced from but disposed adjacent the outer opening and adapted to cooperate with flanges on an associated lid for deflecting water therefrom and extended rearwardly to completely cover said well, and the floor of said box being apertured beneath said well for permitting the application of a dust guard.

17. In combination with a journal box having an opening, a lid pivotally connected to said box for closing said opening, said lid having flange means adjacent the top edge which when the lid is closed overlies an edge portion of the roof of the box, and means upstanding from the roof of said box adjacent the opening, spaced from the outer edge, disposed adjacent said flange means when the lid is closed, and extending for approximately the full width of said box for preventing the entrance of foreign material under the flange means of said lid.

18. A journal box having top, bottom and side walls defining an outer opening, and a lid normally closing said opening and provided with edge portions extending beyond said opening, said box having flange portions on said top wall adjacent said opening for preventing the entrance of foreign material under said lid, said flange portions being disposed rearwardly of the adjacent edge portions of the lid and extending upwardly to shield the joint between said portions and said roof.

19. In combination with a journal box having a roof, a hinge lug thereon and an outer opening, a lid pivotally connected to said lug for closing said opening, said lid having flange means adjacent the top edge which when said lid is closed overlies an edge portion of the roof of the box, and means upstanding from the roof of said box adjacent, but spaced from, said edge portion, disposed adjacent but beyond, and having a generally upright surface facing the free edge of, and extending above the joint with the box formed by said flange means of the lid when closed, and extending from said lug toward the sides of said box for preventing the entrance of foreign material under said flange means.

20. In combination with a journal box having an opening therein, a lid pivotally connected thereto for closing said opening and having an upper flange portion extending at an angle to the body of the lid and normally overlying the outer edge portion of the box roof, and outstanding means on said box roof, spaced inwardly from the front edge thereof, normally disposed adjacent the flange portion of said lid, and extending approximately to the sides of said box, for preventing the entrance of foreign material under said lid, that portion of the box beyond said means being sloped to drain water from the box.

21. A journal box having a roof and an opening adapted to be closed by a lid, said roof being provided with a trough adjacent the opening for draining water or the like from said box and preventing it from entering under said lid, said trough being disposed adjacent the outer edge of said roof and having a bottom wall sloping rearwardly from the opening.

HAROLD K. SMITH.